UNITED STATES PATENT OFFICE.

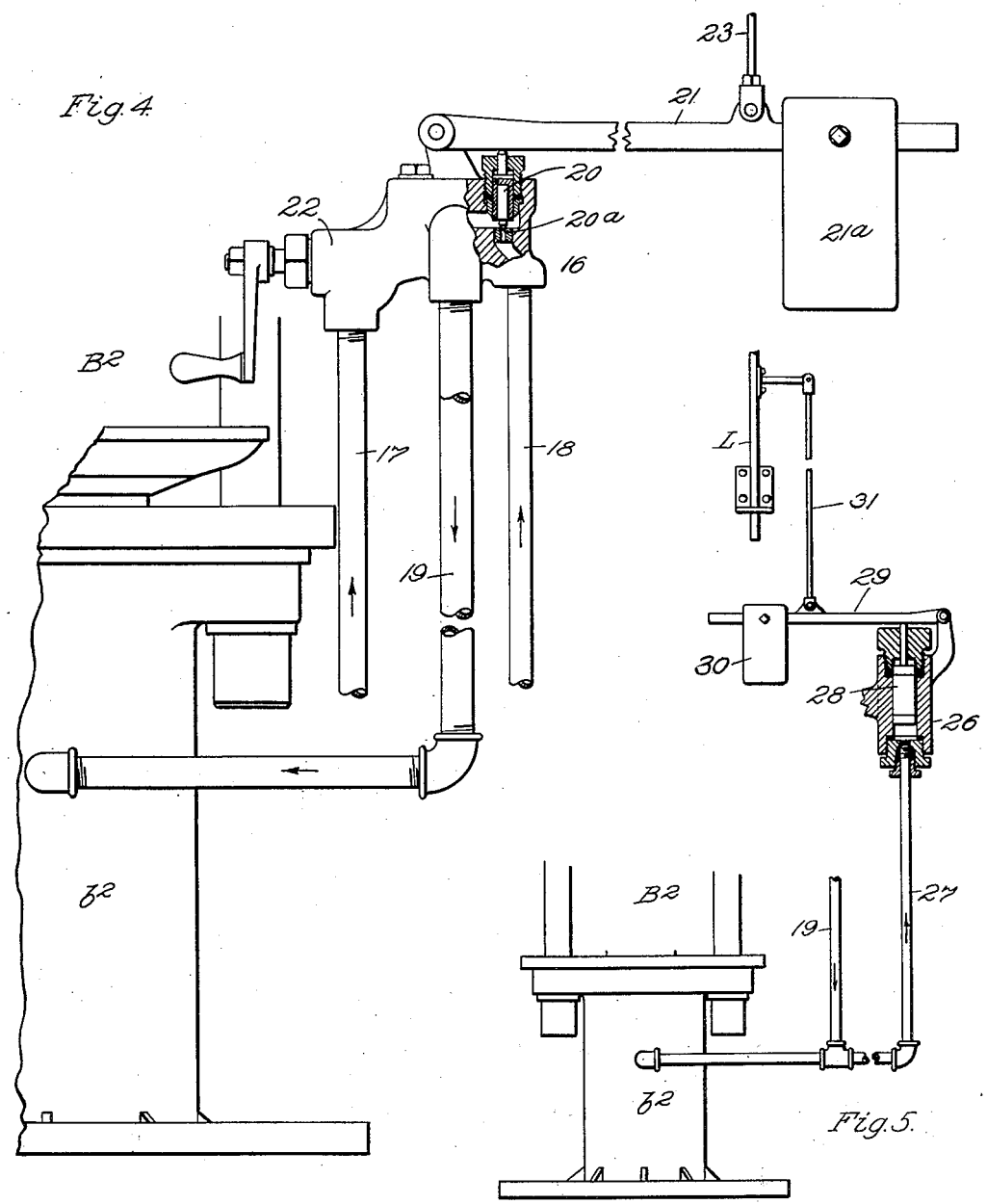

KIRTLAND C. BARTON, OF NATIONAL STOCK YARDS, ILLINOIS, ASSIGNOR TO THE FRENCH OIL MILL MACHINERY CO., OF PIQUA, OHIO.

CONTROLLING MECHANISM FOR MEAL-COOKERS AND THE LIKE.

1,349,143. Specification of Letters Patent. Patented Aug. 10, 1920.

Application filed September 16, 1918. Serial No. 254,245.

*To all whom it may concern:*

Be it known that I, KIRTLAND C. BARTON, a citizen of the United States, residing at National Stock Yards, in the county of St. Clair and State of Illinois, have invented a new and useful Improvement in Controlling Mechanism for Meal-Cookers and the like, of which the following is a specification.

This invention relates to controlling mechanism for automatic cookers of the kind that are used for cooking oil bearing meal preparatory to expressing the oil therefrom. A cooker of this type is shown, for example in Patent No. 1,112,128, granted Sept. 29, 1914, to M. W. Faherty, assignor. This cooker comprises a plurality of kettles or chambers arranged in a descending series to permit the meal to discharge from each kettle into the next lower kettle, and the delivery of the meal from one kettle to the next is automatically controlled by gates in such a manner that when the gate for the next to the bottom kettle is opened the meal will discharge from this second kettle into the bottom kettle until the bottom kettle is filled to a predetermined point. This gate is then closed and the gate of the next kettle above its opened to permit the meal to discharge from the third kettle into the second kettle, and so on, each kettle thus delivering its meal into the next kettle below after the latter kettle has been emptied and its gate closed. In this way the time that the meal remains in the several kettles is controlled and the cooking of the meal regulated.

Ordinarily the cookers employed in oil mills are of a capacity such that the bottom kettle contains enough meal to fill a full line of presses in the mill, that is, for instance, in a six press mill the bottom kettle of the cooker will hold enough meal to make the number of cakes required to fill these six presses. After the cakes have been formed from the meal withdrawn from the bottom kettle and all of the presses are filled and ready to express the oil, the gates of the cooker are caused to operate in the manner explained, to deliver the meal in succession from each kettle to the next kettle below, thus again filling the bottom kettle ready for the next run of cakes. Heretofore, it has been customary to start the automatic operation of the gates either by hand, as shown in the Faherty patent mentioned, or automatically by mechanism controlled by the level of the meal in the bottom kettle, the gate for the second kettle being opened when the bottom kettle is emptied or the meal lowered therein to a predetermined point.

The object of this invention is to provide efficient means of simple and practical construction whereby the automatic operation of the cooker gates is under the control of the last press of the line supplied by the cooker in such a manner that the gate controlling the delivery of meal to the bottom kettle will not be opened and permit this kettle to be filled unil the last press of the line has been filled and is ready for expressing the oil.

In the accompanying drawings:

Fig. 4 is an elevation, partly in section, showing a modification of the invention.

Fig. 5 is a similar view of still another modification of the invention.

Figure 1:
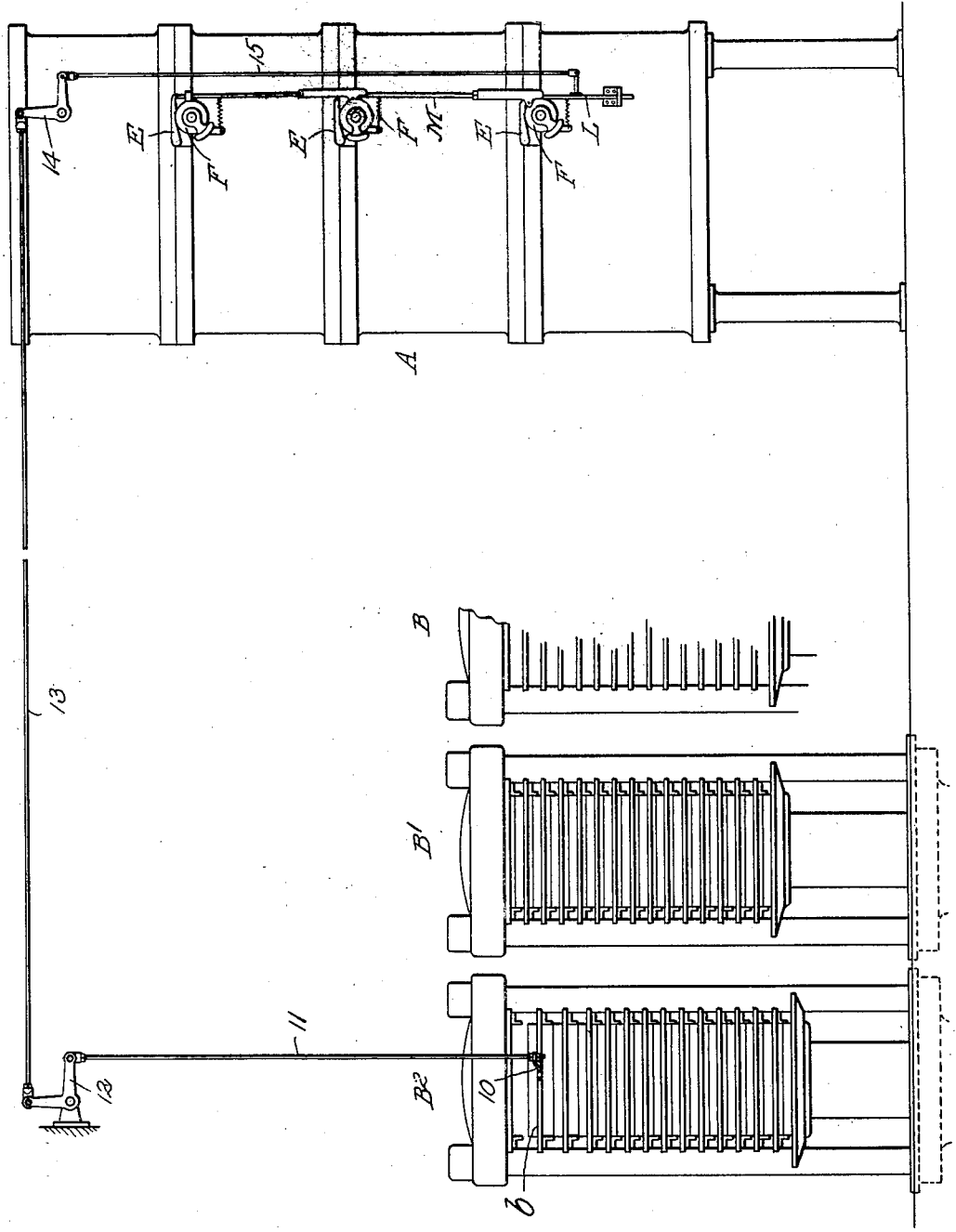
Figure 1 is an elevation showing a meal cooker and a plurality of oil presses equipped with mechanism embodying this invention for controlling the operation of the cooker.
Figure 2:
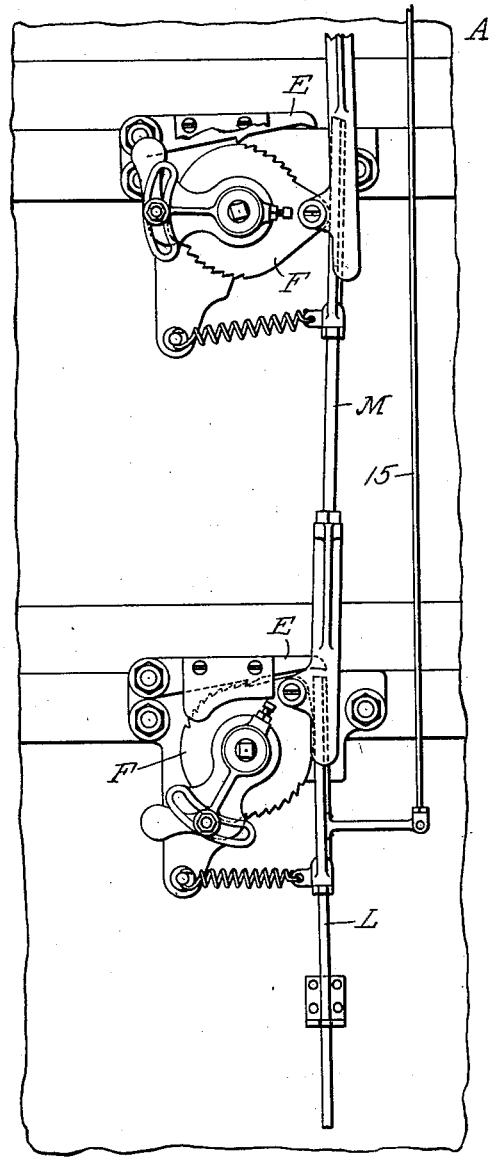
Fig. 2 is a fragmentary elevation, on an enlarged scale, of the cooker and gate operating mechanism therefor.
Figure 3:
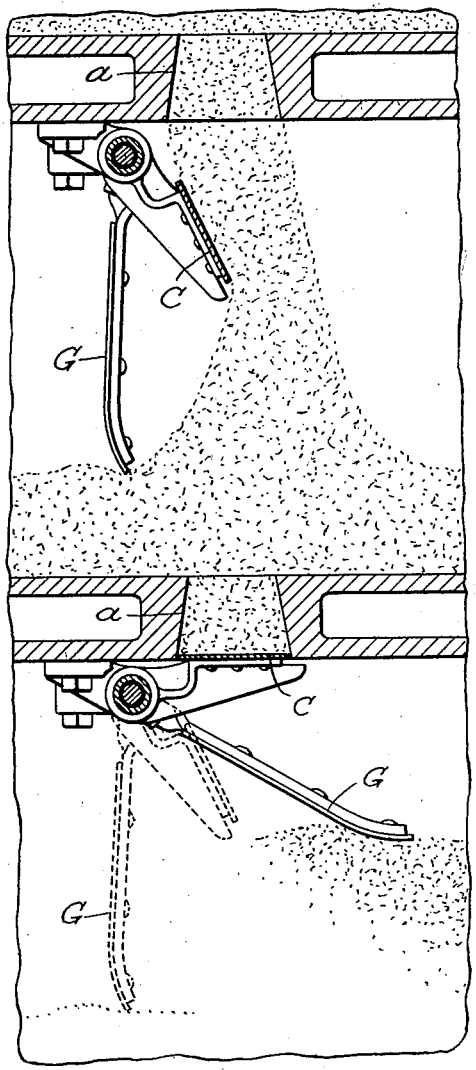
Fig. 3 is a sectional elevation thereof on line 3—3, Fig. 2.

A represents a meal cooker and B B' B² a plurality of oil expressing presses, of which any suitable number may be employed. The meal cooker shown in the drawings comprises a plurality of kettles arranged in a descending series and having bottom openings $a$ through which the meal is adapted to discharge from one kettle into the next lower kettle. The cooker should be of such capacity that the bottom kettle will hold enough meal to fill all of the presses B B' B² which are supplied by the cooker. The discharge of meal through each of the discharge openings $a$ is controlled by a gate C. When all of the meal has been withdrawn from the bottom kettle, or this kettle emptied to the desired extent, a trip rod L is actuated. This trips a latch E and permits the gate C of the second kettle to open and discharge the meal from this kettle into the bottom kettle. As the meal rises in the bottom kettle, it lifts a float or closing device G, which when the meal has risen to a predetermined level in the bottom kettle, closes the gate C of the second kettle. The closing of the gate C turns a disk or wheel F attached to the gate and raises a second trip rod M which, when the gate C for the second kettle is fully closed, trips the latch E for the gate of the next kettle above, permitting the gate of this kettle to open to discharge the meal from the third kettle into the second kettle. The gate of this third kettle is then closed and the gates of the remaining kettles opened and closed in succession in a similar manner. The cooker thus briefly described is constructed and operates as more fully described in said Faherty patent. This cooker could, however, be of any other suitable construction having means adapted, when set in operation to cause the meal to be delivered from one to another of the kettles in succession.

In accordance with this invention the first gate, or gate of the second kettle, is not tripped by hand as in the case of said patented cooker, but the opening of the gate is dependent upon the actuation of mechanism controlled by the filling of the last press B² in the line supplied by the cooker.

In the construction shown in Fig. 1 of the drawings, this controlling mechanism is constructed and operates as follows:—

The uppermost movable press plate b of the last press B² of the line has secured rigidly thereto an arm 10 which projects laterally from the press plate and is connected by a rod or connection 11 to one arm of a bell-crank lever 12 which is suitably pivoted above the press. The other arm of this lever is connected by a rod or connection 13 to one arm of a second bell-crank lever 14 which, as shown, is suitably fulcrumed on the upper portion of the meal cooker. The other arm of this second lever 14 is connected by a rod or connection 15 to the trip rod L for the gate C for the second kettle of the cooker. When the last press B² has been filled with cakes and the pressure oil admitted to the press cylinder the press plates are lifted to compress the material between the plates in a well known manner, and when the uppermost movable plate b is raised it operates through the rods and levers described, to lift the trip rod L and release the gate C for the second kettle so that this gate will open and permit the meal to discharge from the second kettle into the bottom kettle. After this gate has been opened in this manner, the gate is closed and the other gates of the cooker opened and closed in succession automatically, as above explained.

The controlling connections for the cooker gate are preferably made with the uppermost movable press plate b for the reason that this plate is the last one to be moved and moves a definite fixed distance and therefore insures a proper operation of the gate controlling mechanism. The actuation of the cooker gate is thus positive and accurate and the automatic operation of the cooker gates is not commenced until the last press of the line has been filled and sent up. In this way the automatic discharging and refilling of the cooker kettles commences when, and only when, the quantity of meal necessary to fill the entire line of presses has been withdrawn from the bottom kettle, and this ordinarily practically empties the bottom kettle, thus insuring the intended operation of the cooker and the proper cooking of the meal.

The automatic operation of the cooker could, however, be controlled by other means dependent upon the filling or the operation of the last press of the line. For instance, as shown in Figs. 4 and 5, instead of actuating the gate trip rod indirectly through the instrumentality of one of the press plates, the pressure of the press operating oil or liquid which moves the press plate is utilized directly for actuating the trip rod. In the mechanism shown in Fig. 4, 16 represents an automatic change valve such as commonly used for controlling the admission of high pressure oil to the press cylinder $b^2$. This change valve mechanism, as is well known, comprises a low pressure oil supply pipe 17, a high pressure oil supply pipe 18, a pipe 19 leading from the change valve to the press cylinder, and a plunger or member 20 which is subjected to the pressure of the low pressure oil from the supply pipe 17. This plunger is normally seated on a port $20^a$ and prevents the admission of high pressure oil to the press, by suitable means, such as a lever 21 engaging the plunger stem and provided with an adjustable weight $21^a$. When the low pressure supply valve 22 is opened, the oil from the low pressure pipe 17 passes through the pipe 19 to the press cylinder $b^2$ and raises the ram and press plates, taking up the slack and applying pressure to the cakes. When the slack has been taken up and the cakes offer a predetermined resistance to the movement of the press ram, the increased pressure in the change valve moves the plunger or member 20 opening the port $20^a$ to admit the high pressure oil from the pipe 18 to the press cylinder. The movement of the weighted lever 21 of the change valve is utilized for actuating the gate trip rod L of the cooker. For this purpose the lever is shown as connected to a rod 23 which is connected as above explained, by bell crank levers and rods, or other suitable connections to the gate trip rod L. Thus, the pressure of the press operating oil operates directly through the lever 21 and described connections to control the operation of the cooker gates.

In the construction shown in Fig. 5, a cylinder 26 is connected by a pipe 27 to the ram cylinder $b^2$ of the oil press B² and a plunger or member movable in the cylinder 26 is subjected to the pressure of the oil in the press cylinder. The movement of the plunger is opposed by a lever 29 provided with an adjustable weight 30. When the oil in the press cylinder reaches a predetermined pressure, dependent upon the resistance offered by the material in the press, this lever 29 is actuated and through connections such as above described, or other suitable connections, actuates the gate trip rod L of the cooker and causes the automatic operation of the cooker. The plunger cylinder 26 of this mechanism can, if desired be located adjacent to the cooker A and connected directly by a rod 31 or other suitable means to trip the rod L.

I claim as my invention:—

1. The combination with a cooker comprising a plurality of kettles and means for causing the delivery of the material from one kettle to another, and a press for pressing material withdrawn from said cooker, of means which are controlled by the operation of said press and which act when said press is operated to set in action said first mentioned means and cause the delivery of material from one kettle to another.

2. The combination with a cooker comprising a plurality of kettles and means for causing the delivery of material from one kettle to another, and a press for pressing material withdrawn from said cooker, of controlling mechanism in operative connection with said press and with said cooker, said mechanism being actuated by the operation of said press and operating when actuated to set in action said means and cause the delivery of material from one kettle to another.

3. The combination with a cooker comprising a plurality of kettles and means for causing the delivery of material from one kettle to another, and a press for pressing material withdrawn from said cooker, of a controlling device which is moved by the operation of said press, and means for transmitting motion from said controlling device to set in action said first mentioned means and cause the delivery of material from one kettle to another.

4. The combination with a cooker comprising a kettle and means for causing the delivery of material to said kettle, and a press for pressing material withdrawn from said cooker, of controlling mechanism in operative connection with said press and with said cooker, said mechanism being actuated by the operation of said press and operating when actuated to set in action said means and cause the delivery of material to said kettle.

5. The combination with a cooker comprising a kettle and means which operate when set in action to cause the delivery of material to said kettle, and a press, of a controlling device which is moved by the operation of said press, a trip device for setting in action said means, and means for transmitting motion from said controlling device to said trip device.

6. The combination with a cooker comprising a kettle and means for causing the delivery of material to said kettle, and a press having a movable press plate, of controlling mechanism in operative connection with said press plate and with said means, said mechanism being actuated by the movement of said press plate and operating when actuated to set in action said means and cause the delivery of the material to said kettle 7. The combination with a cooker comprising a plurality of kettles arranged to deliver material from one kettle to another, gates controlling the discharge of material from the kettles, and gate-operating mechanism which operates when set in action to cause the opening and closing of said gates one after another, and a press for pressing the material withdrawn from said cooker, of controlling mechanism which is actuated by the operation of said press and operates when actuated to set in action said gate operating mechanism.

8. The combination with a cooker comprising a plurality of kettles and means for causing the delivery of material from one kettle to another, and a press for pressing material withdrawn from said cooker, said press having a capacity adapting it to be filled by material contained in the last kettle of the cooker, of controlling mechanism in operative connection with said press and said cooker, said mechanism being actuated by the operation of said press and operating automatically when actuated to set in action said means and cause the delivery of material from one kettle to another.

9. The combination of a cooker comprising a kettle and means for causing the delivery of material to said kettle, and a press for pressing material withdrawn from said kettle, said press having a capacity adapting it to be filled by material contained in said kettle, of controlling mechanism in operative connection with said press and said cooker, said mechanism being actuated by the operation of said press and operating automatically when actuated to set in action said means and cause the delivery of material to said kettle.

10. The combination with a cooker comprising a kettle and means for causing the delivery of material to said kettle, and one or more presses for pressing material withdrawn from said kettle and having a total capacity adapting said press or presses to be filled by a substantially definite quantity of material withdrawn from said kettle, of controlling mechanism in operative connection with one of said presses and said cooker, said mechanism being actuated by the operation of one of said presses after said presses have been filled, and operating when actuated to set in action said means to cause the delivery of material to said kettle, whereby said delivery mechanism is automatically operated to deliver material to the kettle after the withdrawal from said kettle of said material to fill said press or presses.

Witness my hand this 31st day of August, 1918.

KIRTLAND C. BARTON.

Witnesses:
 CECIL C. BOTHWELL,
 E. H. SCHEMMER.